United States Patent
Lee et al.

(10) Patent No.: US 9,658,434 B2
(45) Date of Patent: May 23, 2017

(54) PHOTOGRAPHIC LENS OPTICAL SYSTEM

(71) Applicant: KOLEN CO., LTD., Seongnam-si (KR)

(72) Inventors: Jong Jin Lee, Seoul (KR); Chan Goo Kang, Seongnam-si (KR)

(73) Assignee: KOLEN CO., LTD. (KR)

( * ) Notice: Subject to any disclaimer, the term of this patent is extended or adjusted under 35 U.S.C. 154(b) by 81 days.

(21) Appl. No.: 14/840,621

(22) Filed: Aug. 31, 2015

(65) Prior Publication Data
US 2016/0161714 A1 Jun. 9, 2016

(30) Foreign Application Priority Data
Dec. 8, 2014 (KR) .................. 10-2014-0175293

(51) Int. Cl.
G02B 13/18 (2006.01)
G02B 9/60 (2006.01)
G02B 13/00 (2006.01)
G02B 5/20 (2006.01)

(52) U.S. Cl.
CPC .......... *G02B 13/0045* (2013.01); *G02B 5/208* (2013.01)

(58) Field of Classification Search
CPC .................................. G02B 13/0045
USPC ................................. 359/713, 714
See application file for complete search history.

(56) References Cited

U.S. PATENT DOCUMENTS

| 2016/0109689 A1 | 4/2016 | Shin et al. |
| 2016/0116705 A1* | 4/2016 | Lee ........................... G02B 9/60 359/714 |
| 2016/0161715 A1* | 6/2016 | Lee ..................... G02B 13/0045 359/714 |
| 2016/0161723 A1* | 6/2016 | Lee ......................... G02B 13/18 348/335 |

FOREIGN PATENT DOCUMENTS

KR 20160046371 4/2016

* cited by examiner

*Primary Examiner* — Scott J Sugarman
(74) *Attorney, Agent, or Firm* — St. Onge Steward Johnston & Reens, LLC

(57) ABSTRACT

Provided is a photographic lens optical system having low manufacturing costs and high performance. A lens optical system includes: first through fifth lenses, which are sequentially arranged along a light proceeding path between an object and an image sensor where an image of the object is formed; and an aperture provided between the object and the image sensor, wherein the first lens has positive refractive power, the second lens has negative refractive power and a flat incident surface, the third lens has positive refractive power and is convex towards the image sensor, the fourth lens has negative refractive power and is a meniscus lens convex towards the image sensor, the fifth lens has negative refractive power, wherein at least one of an incident surface and an emitting surface of the fifth lens is aspheric.

19 Claims, 6 Drawing Sheets

PHOTOGRAPHIC LENS OPTICAL SYSTEM

FIELD OF THE INVENTION

One or more exemplary embodiments relate to an optical apparatus, and more particularly, to a lens optical system applied to a camera.

BACKGROUND OF THE INVENTION

Supply of cameras using a solid image pickup device, such as a charge coupled device (CCD) or a complementary metal oxide semiconductor (CMOS) image sensor, has been generalized.

According to an increase in a degree of pixel integration of the solid image pickup device, resolution is being rapidly increased, and at the same time, performance of a lens optical system is being largely improved, and thus the cameras have high performance, small in size, and light-weight.

According to a lens optical system of a general miniature camera, such as a mobile phone camera, at least one glass lens is included in an optical system including a plurality of lenses so as to secure performance. However, the glass lens not only has a high manufacturing unit price, but also hinders miniaturization of the lens optical system due to restrictions on molding and processes.

Accordingly, a lens optical system that is small in size, lightweight, and may achieve high performance and high resolution while resolving problems generated by using a glass lens has been developed.

SUMMARY OF THE INVENTION

One or more exemplary embodiments include a lens optical system that has low manufacturing expenses, is easily miniaturized, and is light-weighted.

One or more exemplary embodiments include a high performance lens optical system that is suitable to a high resolution camera.

Additional aspects will be set forth in part in the description which follows and, in part, will be apparent from the description, or may be learned by practice of the presented embodiments.

According to one or more exemplary embodiments, a lens optical system includes: first through fifth lenses, which are sequentially arranged along a light proceeding path between an object and an image sensor where an image of the object is formed; and an aperture provided between the object and the image sensor, wherein the first lens has positive refractive power, the second lens has negative refractive power and a flat incident surface, the third lens has positive refractive power and is convex towards the image sensor, the fourth lens has negative refractive power and is a meniscus lens convex towards the image sensor, the fifth lens has negative refractive power, wherein at least one of an incident surface and an emitting surface of the fifth lens is aspheric, and the lens optical system satisfies Conditions 1 and 2 below:

$$70<FOV<90, \quad \text{<Condition 1>}$$

wherein FOV denotes a diagonal viewing angle of the lens optical system; and $$0.75<AL/TTL<1.0, \quad \text{<Condition 2>}$$

wherein AL denotes a distance from the aperture to the image sensor, and TTL denotes a distance along the optical axis from a center of an incident surface of the first lens to the image sensor.

The lens optical system may satisfy Condition 3 below:

$$0.6<TTL/ImgH<0.9, \quad \text{<Condition 3>}$$

wherein ImgH denotes a length in a diagonal direction of an effective pixel region of the image sensor.

The lens optical system may satisfy Condition 4 below:

$$50<(V3+V4)/2<60, \quad \text{<Condition 4>}$$

wherein V3 denotes an Abbe's number of the third lens and V4 denotes an Abbe's number of the fourth lens.

The lens optical system may satisfy Condition 5 below:

$$0.6<(TTL/ImgH)/BFL<1.5, \quad \text{<Condition 5>}$$

wherein BFL denotes a distance along the optical axis from a center of the emitting surface of the fifth lens to the image sensor, and ImgH denotes a length in a diagonal direction of an effective pixel region of the image sensor.

The lens optical system may satisfy Condition 6 below:

$$1.3<Ind4<1.7, \quad \text{<Condition 6>}$$

wherein Ind4 denotes a refractive index of the fourth lens.

The lens optical system may satisfy Condition 7 below:

$$35°<CRA8<45°, \quad \text{<Condition 7>}$$

wherein CRA8 denotes a chief ray angle incident on a Y-axis 0.8 field with respect to the image sensor.

The first lens may have an incident surface convex towards the object.

An incident surface of the second lens may be flat towards the object. An emitting surface of the second lens may be concave from the image sensor.

At least one of the first through fourth lenses may be an aspheric lens.

At least one of an incident surface and an emitting surface of at least one of the first through fourth lenses may be aspheric.

At least one of the incident surface and the emitting surface of the fifth lens may have at least one inflection point from a center portion to an edge.

The incident surface of the fifth lens may have at least one inflection point from the center portion to the edge.

The center portion of the incident surface of the fifth lens may be convex towards the object, and may be concave and then convex towards the edge.

The center portion of the incident surface of the fifth lens may be convex towards the object, and may be concave, convex, and then concave towards the edge.

The second through fifth lenses may each be an aberration correction lens.

The aperture may be further provided between the object and the image sensor.

The aperture may be provided between the object and the first lens.

An infrared blocking unit may be further provided between the object and the image sensor.

The infrared blocking unit may be disposed between the fifth lens and the image sensor.

At least one of the first through fifth lenses may be a plastic lens.

According to one or more exemplary embodiments, a lens optical system includes: first through fifth lenses, which are sequentially arranged from an object, between the object and an image sensor where an image of the object is formed; and an aperture provided between the object and the image sensor, wherein the first through fifth lenses respectively have positive, negative, positive, negative, and negative refractive powers, and the lens optical system satisfies at least one of Conditions 1 through 4 below:

$$70 < FOV < 90, \qquad \text{<Condition 1>}$$

wherein FOV denotes a diagonal viewing angle of the lens optical system;

$$0.75 < AL/TTL < 1.0, \qquad \text{<Condition 2>}$$

wherein AL denotes a distance from the aperture to the image sensor, and TTL denotes a distance along the optical axis from a center of an incident surface of the first lens to the image sensor;

$$0.6 < TTL/ImgH < 0.9, \qquad \text{<Condition 3>}$$

wherein ImgH denotes a length in a diagonal direction of an effective pixel region of the image sensor; and $$50 < (V3 + V4)/2 < 60, \qquad \text{<Condition 4>}$$

wherein V3 denotes an Abbe's number of the third lens and V4 denotes an Abbe's number of the fourth lens.

The lens optical system may further satisfy Condition 5 below:

$$0.6 < (TTL)ImgH/BFL < 1.5, \qquad \text{<Condition 5>}$$

wherein BFL denotes a distance along the optical axis from a center of an emitting surface of the fifth lens to the image sensor.

The lens optical system may further satisfy one of Conditions 6 and 7 below:

$$1.3 < Ind4 < 1.7, \qquad \text{<Condition 6>}$$

wherein Ind4 denotes a refractive index of the fourth lens; and $$35° < CRA8 < 45°, \qquad \text{<Condition 7>}$$

wherein CRA8 denotes a chief ray angle incident on an Y-axis 0.8 field with respect to the image sensor.

The second lens may be concave with respect to the image sensor.

The third lens may be convex towards the image sensor.

The fourth lens may be a meniscus lens convex towards the image sensor and the fifth lens may be an aspheric lens.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Figure 1:
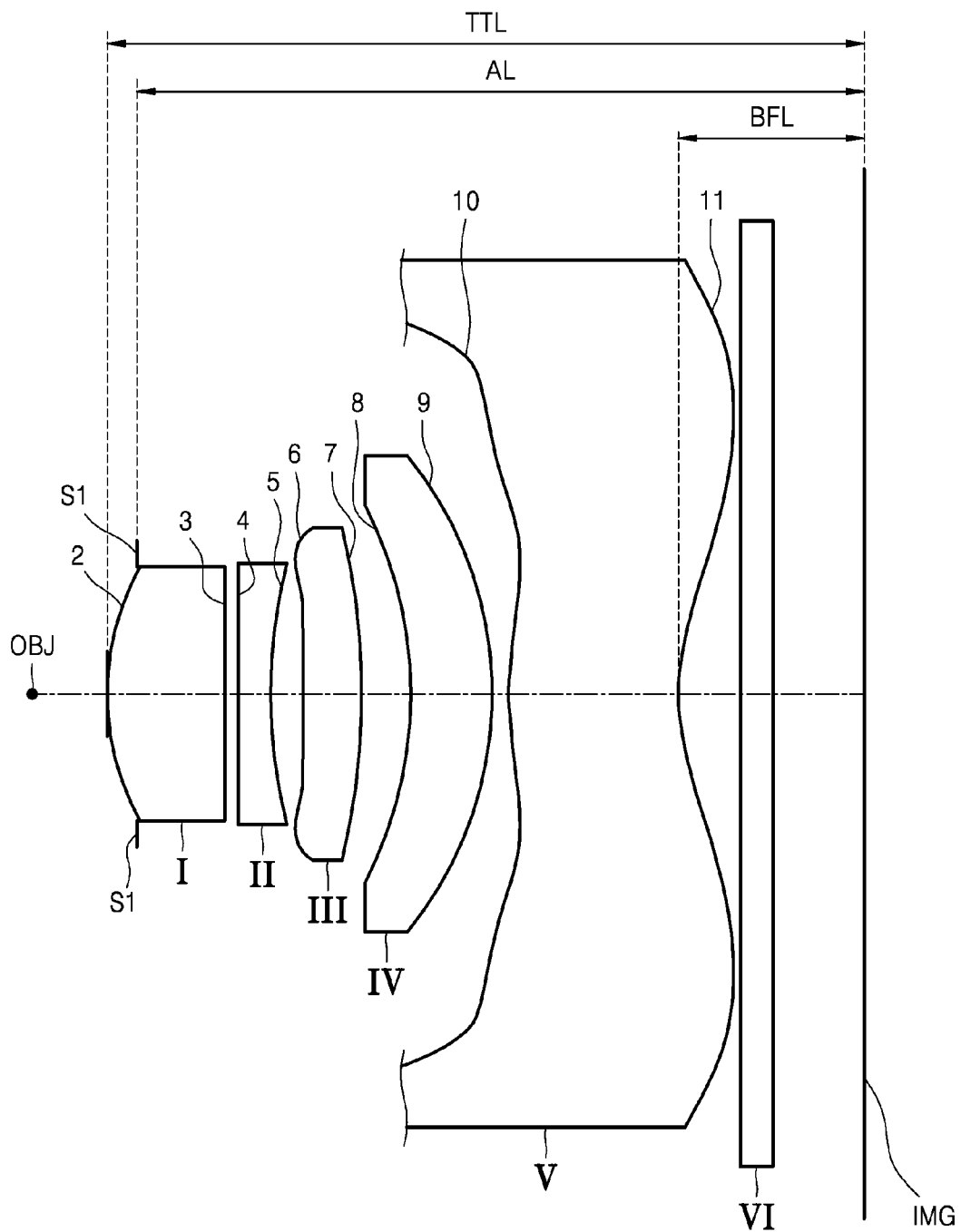
FIG. 1 is a cross-sectional view showing an arrangement of main components of a lens optical system, according to an exemplary embodiment.

Reference will now be made in detail to embodiments, examples of which are illustrated in the accompanying drawings, wherein like reference numerals refer to like elements throughout.

Figure 2:
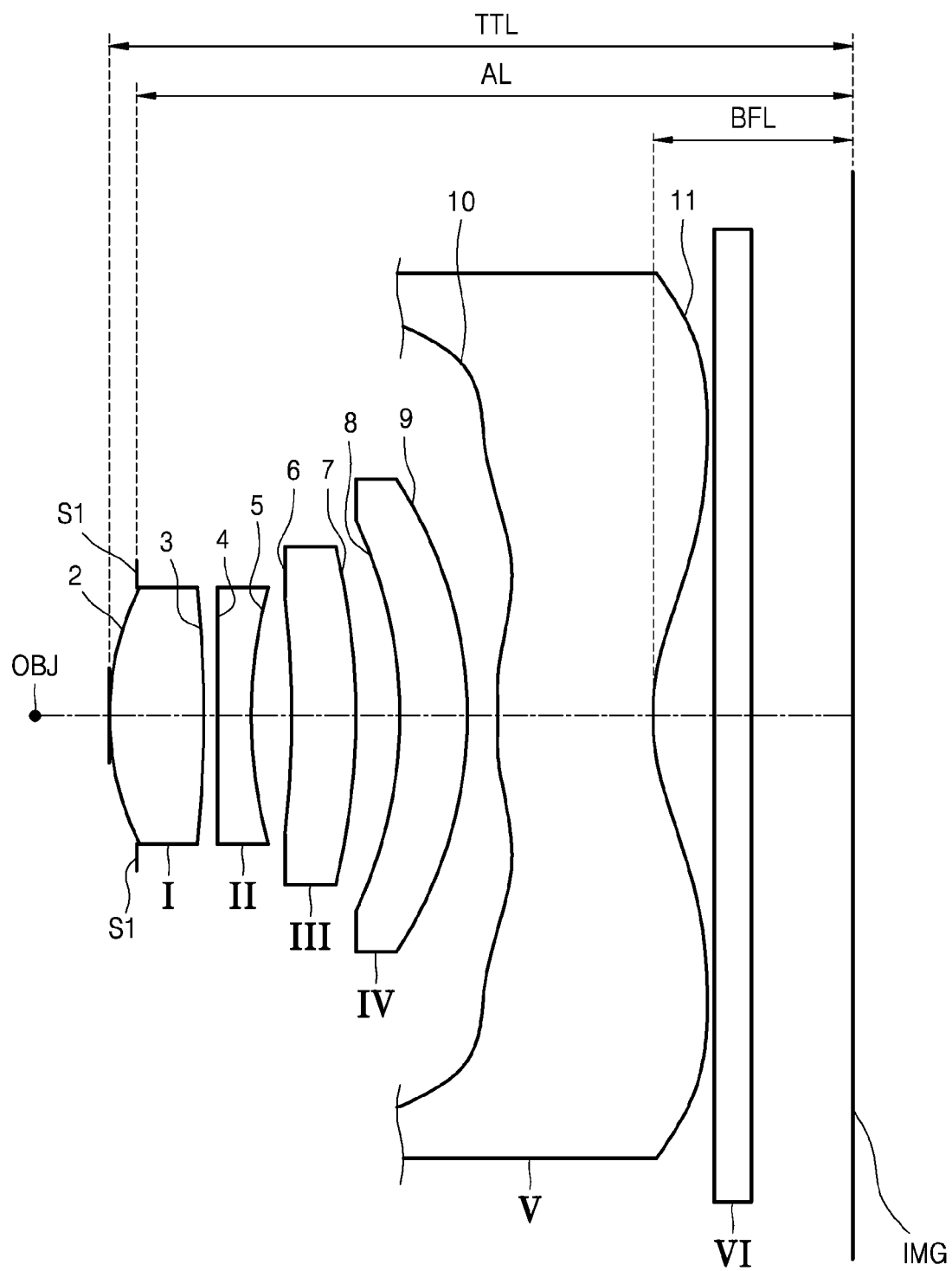
FIG. 2 is a cross-sectional view showing an arrangement of main components of a lens optical system, according to another exemplary embodiment.
Figure 3:
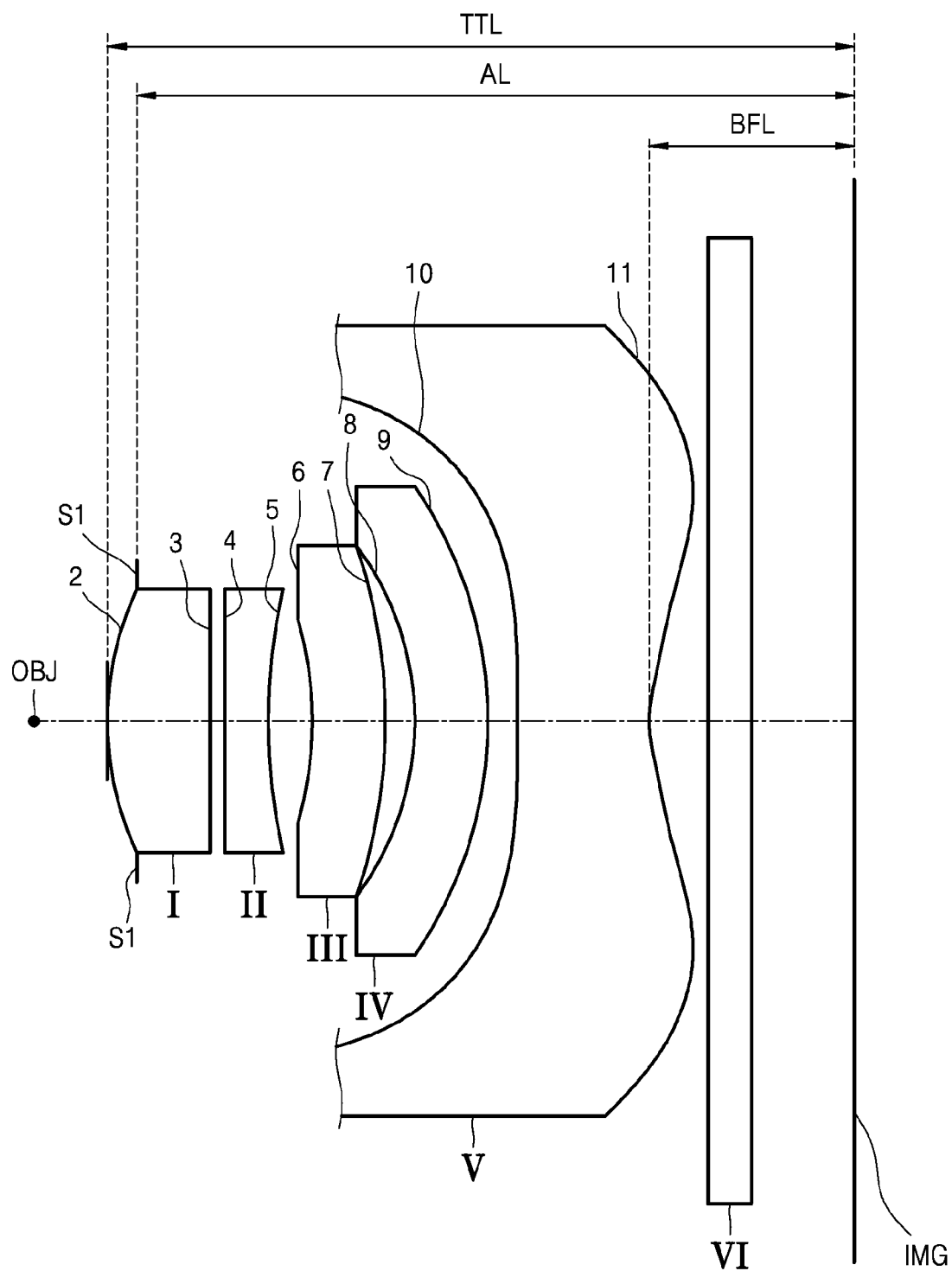
FIG. 3 is a cross-sectional view showing an arrangement of main components of a lens optical system, according to another exemplary embodiment.

FIGS. 1 through 3 are cross-sectional views showing an arrangement of main components of a lens optical system, according to exemplary embodiments.

Referring to FIGS. 1 through 3, the lens optical system includes first through fifth lenses I through V, which are sequentially arranged from an object OBJ, between the object OBJ and an image sensor IMG where an image of the object OBJ is formed. The first lens I may have positive (+) refractive power and be convex towards the object OBJ. An incident surface 2 of the first lens I may be convex towards the object OBJ and an emitting surface 3 of the first lens I may be convex towards the image sensor IMG.

The second lens II may have negative (−) refractive power and a flat incident surface 4. Also, an emitting surface 5 of the second lens II may be concave from the image sensor IMG.

The third lens III may have positive (+) refractive power and may be convex towards the image sensor IMG. Accordingly, both an incident surface 6 and an emitting surface 7 of the third lens III may be convex towards the image sensor IMG.

The fourth lens IV may have negative (−) refractive power and may be a meniscus lens convex towards the image sensor IMG. Accordingly, both surfaces, i.e., an incident surface 8 and an emitting surface 9, of the fourth lens IV may be convex towards the image sensor IMG.

At least one of the first through fourth lenses I through IV may be an aspheric lens. In other words, at least one of the incident surface 2, 4, 6, or 8 and the emitting surface 3, 5, 7, or 9 of at least one of the first through fourth lenses I through IV may be aspheric. For example, the incident surface 2, 4, 6, or 8 and the emitting surface 3, 5, 7, or 9 of each of the first through fourth lenses I through IV may both be aspheric.

The fifth lens V may have negative (−) refractive power, and at least one of an incident surface 10 and an emitting surface 11 of the fifth lens V may be aspheric. For example, at least one of the incident surface and the emitting surface 11 may be aspheric while having at least one inflection point from a center portion to an edge.

The incident surface 10 of the fifth lens V may have at least one inflection point from the center portion to the edge. In other words, the incident surface 10 may have one or more inflection points from the center portion to the edge within an effective lens region (i.e., an effective diameter region) of the fifth lens V.

Within the effective diameter region of the fifth lens V, the center portion of the incident surface 10 may be convex towards the object OBJ, and may be concave and then convex towards the edge. Alternatively, throughout the fifth lens V, the center portion of the incident surface 10 may be convex towards the object OBJ, and concave, convex, and then concave towards the edge.

The emitting surface 11 of the fifth lens V may have at least one inflection point from the center portion to the edge.

Accordingly, the center portion of the emitting surface 11 may be concave towards the image sensor IMG and convex towards the edge.

In the lens optical system having such a structure, the first lens I may have strong positive refractive power and the second through fifth lenses II through V may operate as an aberration correction lens.

An aperture S1 and an infrared blocking unit VI may be further provided between the object OBJ and the image sensor IMG. The aperture S1 may be provided between the object OBJ and the first lens I. In other words, the aperture S1 may be disposed adjacent to the incident surface 2 of the first lens I.

The infrared blocking unit VI may be provided between the fifth lens V and the image sensor IMG. The infrared blocking unit VI may be an infrared blocking filter. Locations of the aperture S1 and the infrared blocking unit VI may be switched around.

In FIGS. 1 through 3, a total track length (TTL) denotes a distance from a center of the incident surface 2 of the first lens I to the image sensor IMG, i.e., a total length of the lens optical system, a back focal length (BFL) denotes a distance from a center of the emitting surface 11 of the fifth lens V to the image sensor IMG, and an aperture length (AL) denotes a distance from the aperture S1 to the image sensor IMG.

The lens optical system described above according to the exemplary embodiments may satisfy at least one of Conditions 1 through 7 below.

$$70 < FOV < 90 \qquad \text{<Condition 1>}$$

Here, FOV denotes a diagonal viewing angle (degree) of an optical system. By limiting the diagonal viewing angle according to Condition 1, an optical lens that has low aberration while realizing high resolution may be obtained. In detail, the lowest limit of FOV may be 80.

$$0.75 < AL/TTL < 1.0 \qquad \text{<Condition 2>}$$

Here, AL denotes a distance from an aperture to a sensor, and TTL denotes a distance along the optical axis from a center of an incident surface of a first lens to the sensor. According to Condition 2, the aperture may be disposed between an object and the first lens or between the first lens and a second lens. Accordingly, an optimized wide-angle lens may be realized.

$$0.6 < TTL/ImgH < 0.9 \qquad \text{<Condition 3>}$$

Here, ImgH denotes a distance in a diagonal direction of an effective pixel region of an image sensor.

According to Condition 3, a range of a ratio of TTL to ImgH is stabilized. When the ratio is too close to or lower than the lowest value, thickness of an optical system is reduced, but it is difficult to correct aberrations. When the ratio is too close to or higher than the highest value, it is easy to correct aberrations but it is difficult to compactly design an optical system.

$$50 < (V3+V4)/2 < 60 \qquad \text{<Condition 4>}$$

Here, V3 denotes an Abbe's number of a third lens and V4 denotes an Abbe's number of a fourth lens.

According to Condition 4, the third and fourth lenses may be formed of plastic. Accordingly, manufacturing unit prices of the third and fourth lenses may be reduced and a compact optical system may be manufactured.

$$0.6 < (TTL/ImgH)/BFL < 1.5 \qquad \text{<Condition 5>}$$

BFL denotes a distance along the optical axis from a center of an emitting surface of a fifth lens to a sensor. Condition 5 limits a ratio between ImgH, TTL, and BFL. When the ratio is close to the lowest value, it is easy to manufacture an optical lens but difficult to correct aberrations. When the ratio is close to the highest value, it is easy to correct aberrations but difficult to manufacture an optical lens.

$$1.3 < Ind4 < 1.7 < \qquad \text{<Condition 6>}$$

Here, Ind4 denotes a refractive index of a fourth lens. According to Condition 6, the fourth lens may be formed of a low refractive material, thereby reducing manufacturing costs of the fourth lens.

$$35° < CRA8 < 45° \qquad \text{<Condition 7>}$$

Here, CRA8 denotes a chief ray angle incident on a Y-axis 0.8 field with respect to an image sensor.

Condition 7 limits a chief ray angle value in a sensor 0.8F, and thus an optical system having a wide angle optimized to prevent vignetting may be manufactured.

According to the lens optical systems (hereinafter, also respectively referred to as EMB1 through EMB3) of FIGS. 1 through 3, Table 1 shows values of Conditions 1 through 7 (CON1 through CON7).

TABLE 1

|  | CON1 [FOV] | AL | TTL | CON2 [AL/TTL] | ImgH | CON3 [TTL/ImgH] | V3, V4 | CON4 [(V3 + V4)/2] | BFL | CON5 [TTL/ImgH/BFL] | CON6 [Ind4] | CON7 [CRA8] |
|---|---|---|---|---|---|---|---|---|---|---|---|---|
| EMB1 | 79.698 | 4.330 | 4.500 | 0.962 | 5.868 | 0.767 | 55.856 | 55.856 | 1.100 | 0.697 | 1.534 | 37.026 |
| EMB2 | 80.999 | 4.110 | 4.270 | 0.962 | 5.868 | 0.728 | 55.856 | 55.856 | 1.150 | 0.633 | 1.534 | 38.504 |
| EMB3 | 78.354 | 4.088 | 4.270 | 0.957 | 5.868 | 0.728 | 55.856 | 55.856 | 1.150 | 0.633 | 1.534 | 35.640 |

As shown in Table 1, EMB1 through EMB3 all satisfy Conditions 1 through 7.

In the lens optical system having the above structure according to the exemplary embodiments, the first through fifth lenses I through V may be formed of plastic considering their shapes and dimensions. In other words, the first through fifth lenses I through V may all be a plastic lens. If a glass lens is used, a lens optical system not only has high manufacturing unit costs, but also is difficult to miniaturize due to restrictions on molding and processes. However, since the first through fifth lenses I through V may be formed of plastic, manufacturing unit costs may be decreased and a lens optical system may be miniaturized. As occasion demands, at least one of the first through fifth lens I through V may be formed of glass.

EMB1 through EMB3 will now be described in detail with reference to lens data and attached drawings.

Tables 2 through 4 below show a curvature radius, a lens thickness or a distance between lenses, a refractive index, and an Abbe's number of each lens forming the lens optical systems of FIGS. 1 through 3. In Tables 2 through 4, R denotes a curvature radius, D denotes a lens thickness, a lens interval, or an interval between adjacent components, Nd denotes a refractive index of a lens measured by using a d-line, and Vd denotes an Abbe's number of a lens with respect to the d-line. A mark "*" besides a lens surface number denotes that a lens surface is aspheric. Also, a unit of values of R and D is mm.

In EMB1 of Table 2, an F-number is 2.33 and a focal length F is 3.5233 mm, in EMB2 of Table 3, an F-number is 2.33 and a focal length F is 3.4197 mm, and in EMB3 of Table 4, an F-number is 2.33 and a focal length F is 3.5588 mm.

TABLE 2

| EMB 1 | S | R | T | Nd | Vd |
|---|---|---|---|---|---|
|  | 1 | Infinity | 0.1699 |  |  |
|  | S1 | Infinity | −0.1699 |  |  |
| I | 2* | 1.5456 | 0.6952 | 1.5340 | 55.856 |
|  | 3* | 38.3278 | 0.0685 |  |  |
| II | 4* | Infinity | 0.1900 | 1.6483 | 22.434 |
|  | 5* | 3.6961 | 0.2016 |  |  |
| III | 6* | 19.3001 | 0.3493 | 1.5340 | 55.856 |
|  | 7* | −6.4448 | 0.3013 |  |  |
| IV | 8* | −1.6590 | 0.4786 | 1.5340 | 55.856 |
|  | 9* | −1.8370 | 0.1000 |  |  |
| V | 10* | 1.9700 | 1.0155 | 1.5340 | 55.856 |
|  | 11* | 1.3543 | 0.3500 |  |  |
| VI | 12 | Infinity | 0.2100 | 1.5297 | 39.068 |
|  | 13 | Infinity | 0.5554 |  |  |
|  | IMG | Infinity | −0.0154 |  |  |

TABLE 3

| EMB 2 | S | R | T | Nd | Vd |
|---|---|---|---|---|---|
|  | 1 | Infinity | 0.1601 |  |  |
|  | S1 | Infinity | −0.1601 |  |  |
| I | 2* | 1.4956 | 0.5439 | 1.5340 | 55.856 |
|  | 3* | −51.5025 | 0.0685 |  |  |
| II | 4* | Infinity | 0.2000 | 1.6483 | 22.434 |
|  | 5* | 3.6440 | 0.2439 |  |  |
| III | 6* | −17.1734 | 0.3553 | 1.5340 | 55.856 |
|  | 7* | −5.0408 | 0.2597 |  |  |
| IV | 8* | −1.5249 | 0.3949 | 1.5340 | 55.856 |
|  | 9* | −1.6719 | 0.1638 |  |  |
| V | 10* | 1.6177 | 0.8899 | 1.5340 | 55.856 |
|  | 11* | 1.1551 | 0.3500 |  |  |
| VI | 12 | Infinity | 0.2100 | 1.5297 | 39.068 |
|  | 13 | Infinity | 0.6120 |  |  |
|  | IMG | Infinity | −0.0220 |  |  |

TABLE 4

| EMB 3 | S | R | T | Nd | Vd |
|---|---|---|---|---|---|
|  | 1 | Infinity | 0.1817 |  |  |
|  | Stop | Infinity | −0.1817 |  |  |
| I | 2* | 1.4035 | 0.5953 | 1.5340 | 55.856 |
|  | 3* | 250.8822 | 0.0685 |  |  |
| II | 4* | Infinity | 0.2300 | 1.6483 | 22.434 |
|  | 5* | 4.0533 | 0.2583 |  |  |
| III | 6* | −8.3645 | 0.4415 | 1.5340 | 55.856 |
|  | 7* | −2.4314 | 0.1683 |  |  |
| IV | 8* | −1.0835 | 0.3791 | 1.5340 | 55.856 |
|  | 9* | −1.2204 | 0.1611 |  |  |
| V | 10* | 3.0000 | 0.8179 | 1.5340 | 55.856 |
|  | 11* | 1.3108 | 0.3500 |  |  |
| VI | 12 | Infinity | 0.2100 | 1.5297 | 39.068 |
|  | 13 | Infinity | 0.6020 |  |  |
|  | IMG | Infinity | −0.0120 |  |  |

An aspheric surface of each lens in the lens optical systems of FIGS. 1 through 3 satisfies an aspheric formula below.

$$x = \frac{R \cdot H^2}{1 + \sqrt{1 - (K+1)R^2 H^2}} + Ay^4 + By^6 + Cy^8 + Dy^{10} + Ey^{12} + Fy^{14} + Gy^{16}$$

Here, x denotes a distance (depth) from an apex of a lens in an optical axis direction, H denotes a distance (height) in a perpendicular direction as an optical axis, R denotes an inverse of a paraxial curvature radius (1/r) at an apex of a lens, K denotes a conic constant, and A through G each denote an aspheric coefficient.

Tables 5 through 7 below show aspheric coefficients of aspheric surfaces respectively in the lens optical systems of FIGS. 1 through 3. In other words, Tables 5 through 7 show aspheric coefficients of the incident surfaces 2, 4, 6, 8, and 10 and the emitting surfaces 3, 5, 7, 9, and 11 of Tables 2 through 4.

TABLE 5

| S | K | A | B | C | D | E | F | G |
|---|---|---|---|---|---|---|---|---|
| 2 | −0.2463 | −0.0051 | 0.0454 | −0.1459 | 0.1736 | −0.1030 | — | — |
| 3 | 0.0000 | −0.0372 | −0.0393 | −0.0958 | 0.1877 | −0.1322 | — | — |
| 4 | — | — | — | — | — | — | — | — |
| 5 | 3.7533 | 0.0096 | 0.0957 | −0.0874 | 0.1230 | −0.0061 | — | — |
| 6 | 0.0000 | −0.1256 | −0.0235 | −0.0180 | −0.0156 | 0.2292 | — | — |
| 7 | 0.0000 | −0.0162 | −0.1480 | 0.0620 | 0.0220 | 0.0357 | — | — |
| 8 | −18.4714 | −0.0479 | 0.0217 | −0.0639 | 0.0412 | −0.0009 | 0.0231 | −0.0212 |
| 9 | −0.4455 | −0.0212 | −0.0024 | 0.0426 | −0.0132 | −0.0010 | 0.0016 | −0.0008 |
| 10 | −13.6542 | −0.1847 | 0.0537 | −0.0012 | −0.0005 | −0.0001 | −0.0000 | 0.0000 |
| 11 | −4.1631 | −0.0835 | 0.0337 | −0.0095 | 0.0013 | −0.0000 | −0.0000 | −0.0000 |

TABLE 6

| S | K | A | B | C | D | E | F | G |
|---|---|---|---|---|---|---|---|---|
| 2 | −0.3575 | −0.0089 | 0.0252 | −0.1513 | 0.1733 | −0.2349 | — | — |
| 3 | 0.0000 | −0.0579 | −0.0740 | −0.1096 | 0.1779 | −0.1913 | — | — |
| 4 | — | — | — | — | — | — | — | — |

TABLE 6-continued

| S | K | A | B | C | D | E | F | G |
|---|---|---|---|---|---|---|---|---|
| 5 | 6.1052 | 0.0202 | 0.1044 | −0.0910 | 0.1197 | 0.0467 | — | — |
| 6 | 0.0000 | −0.1353 | −0.0184 | 0.0060 | 0.0267 | 0.2732 | — | — |
| 7 | 0.0000 | −0.0022 | −0.1455 | 0.0667 | 0.0280 | 0.0510 | — | — |
| 8 | −18.0311 | −0.0190 | 0.0226 | −0.0672 | 0.0383 | −0.0025 | 0.0231 | −0.0200 |
| 9 | −1.1997 | −0.0007 | 0.0017 | 0.0412 | −0.0141 | −0.0015 | 0.0014 | −0.0009 |
| 10 | −11.4023 | −0.1817 | 0.0539 | −0.0016 | −0.0005 | −0.0001 | −0.0000 | 0.0000 |
| 11 | −4.5450 | −0.0853 | 0.0341 | −0.0095 | 0.0013 | −0.0000 | −0.0000 | −0.0000 |

TABLE 7

| S | K | A | B | C | D | E | F | G |
|---|---|---|---|---|---|---|---|---|
| 2 | −0.2562 | −0.0018 | 0.0138 | −0.1418 | 0.2358 | −0.2737 | — | — |
| 3 | 0.0000 | −0.0680 | −0.0562 | −0.1126 | 0.1490 | −0.1375 | — | — |
| 4 | — | — | — | — | — | — | — | — |
| 5 | 11.0564 | 0.0419 | 0.1154 | −0.0672 | 0.1424 | 0.0297 | — | — |
| 6 | 0.0000 | −0.1252 | −0.0158 | 0.0203 | 0.0361 | 0.2498 | — | — |
| 7 | 0.0000 | 0.0086 | −0.1283 | 0.0612 | 0.0159 | 0.0467 | — | — |
| 8 | −6.0153 | 0.0109 | 0.0187 | −0.0793 | 0.0431 | 0.0067 | 0.0215 | −0.0349 |
| 9 | −3.2271 | 0.0118 | −0.0016 | 0.0396 | −0.0173 | −0.0032 | 0.0014 | −0.0001 |
| 10 | −42.3752 | −0.2132 | 0.0552 | −0.0029 | −0.0001 | 0.0003 | 0.0001 | −0.0000 |
| 11 | −7.1770 | −0.0829 | 0.0291 | −0.0087 | 0.0013 | −0.0000 | −0.0000 | −0.0000 |

Figure 4:
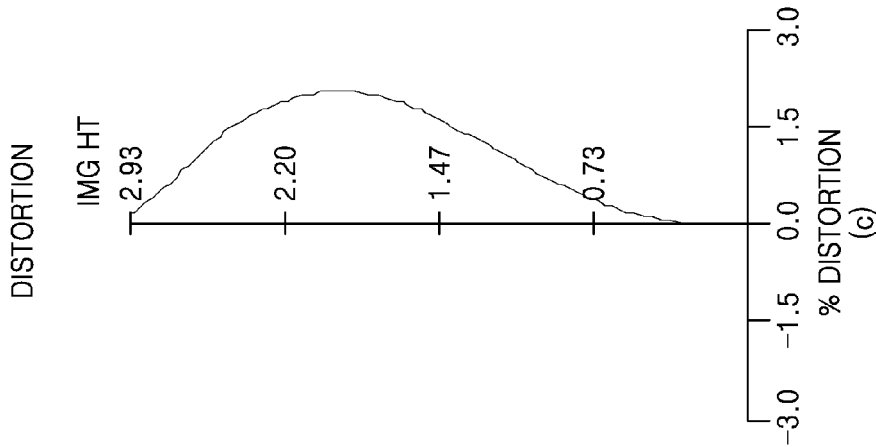
FIG. 4 illustrates longitudinal spherical aberrations, astigmatic field curvatures, and distortion of a lens optical system, according to an exemplary embodiment.
Figure 4:
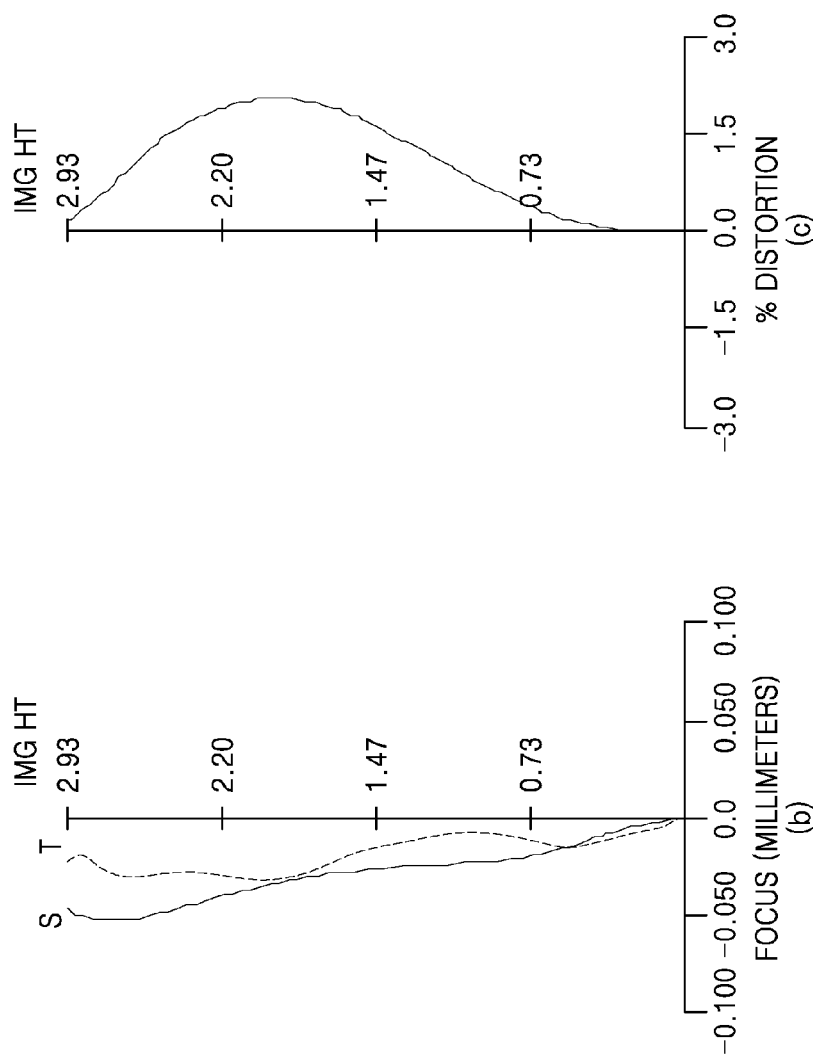
Figure 4:
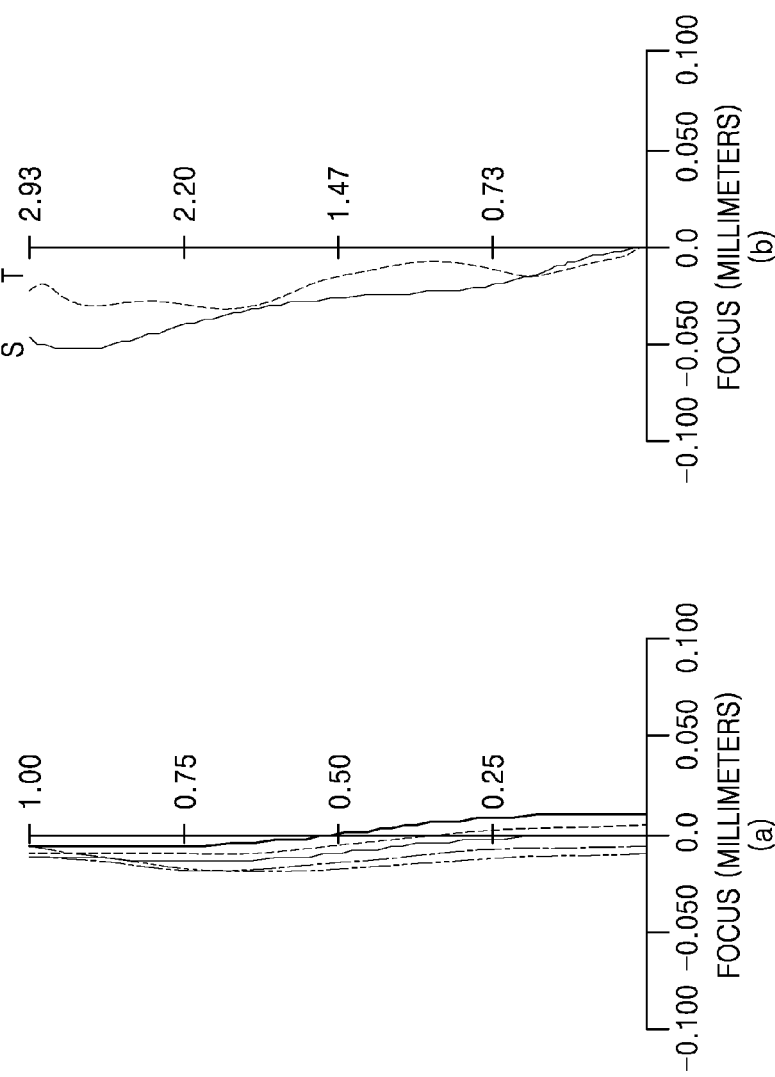

FIG. 4 illustrates longitudinal spherical aberrations (a), astigmatic field curvatures (b), and distortion of the lens optical system (c) of FIG. 1 according to Table 2.

FIG. 4 (a) shows the longitudinal spherical aberrations of the lens optical system with respect to light having various wavelengths, FIG. 4 (b) shows the astigmatic field curvatures, i.e., tangential field curvatures T and sagittal field curvatures S. The wavelengths used to obtain the longitudinal spherical aberrations were 656.0000 nm, 587.6000 nm, 546.1000 nm, 486.1000 nm, and 435.8000 nm. The wavelength used to obtain the astigmatic field curvatures and the distortion was 546.1000 nm. The same wavelengths were used in obtaining the values shown in FIGS. 5 and 6.

Figure 5:
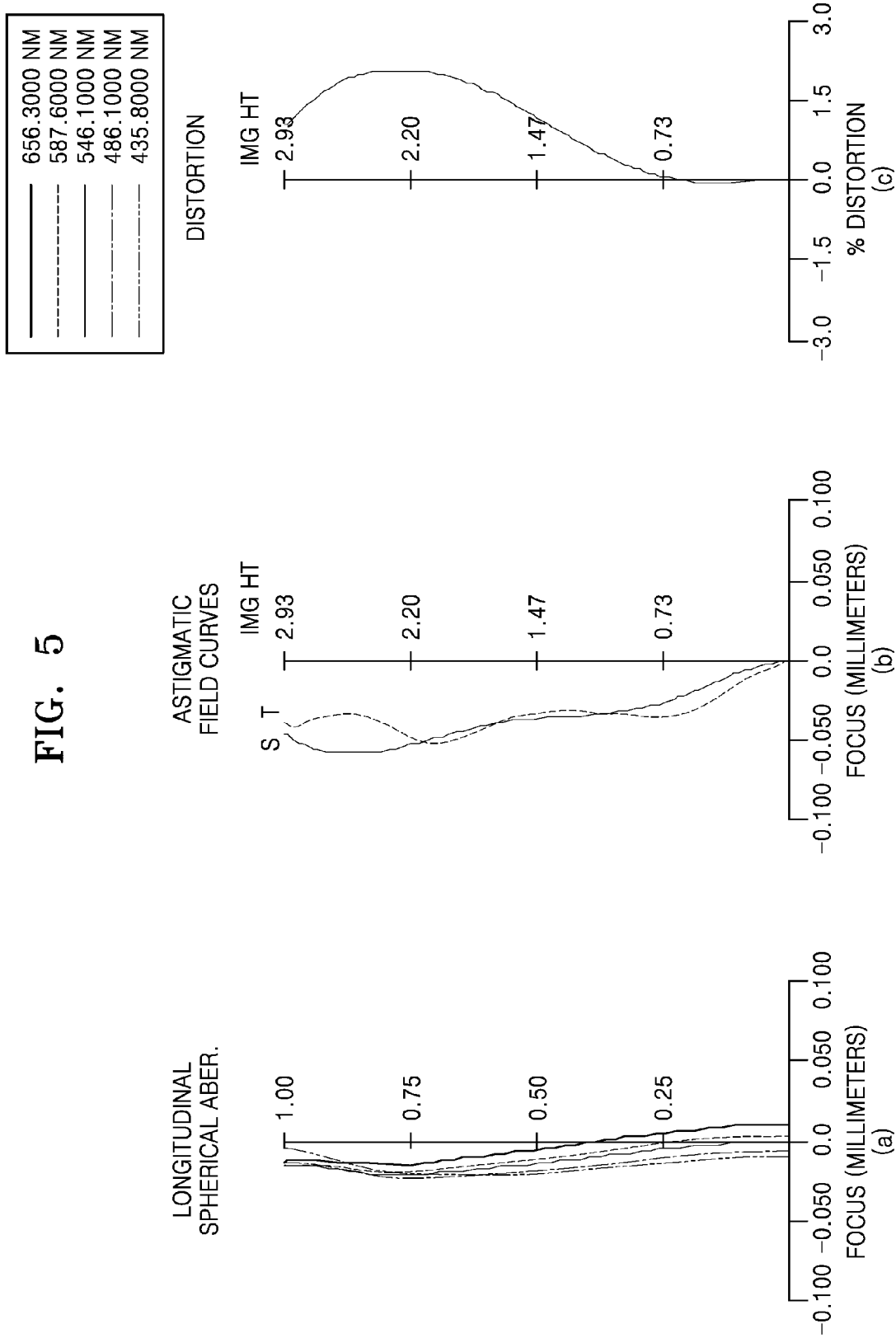
FIG. 5 illustrates longitudinal spherical aberrations, astigmatic field curvatures, and distortion of a lens optical system, according to another exemplary embodiment.

FIG. 5 illustrates longitudinal spherical aberrations, astigmatic field curvatures, and distortion of the lens optical system of FIG. 2 according to Table 3.

Figure 6:
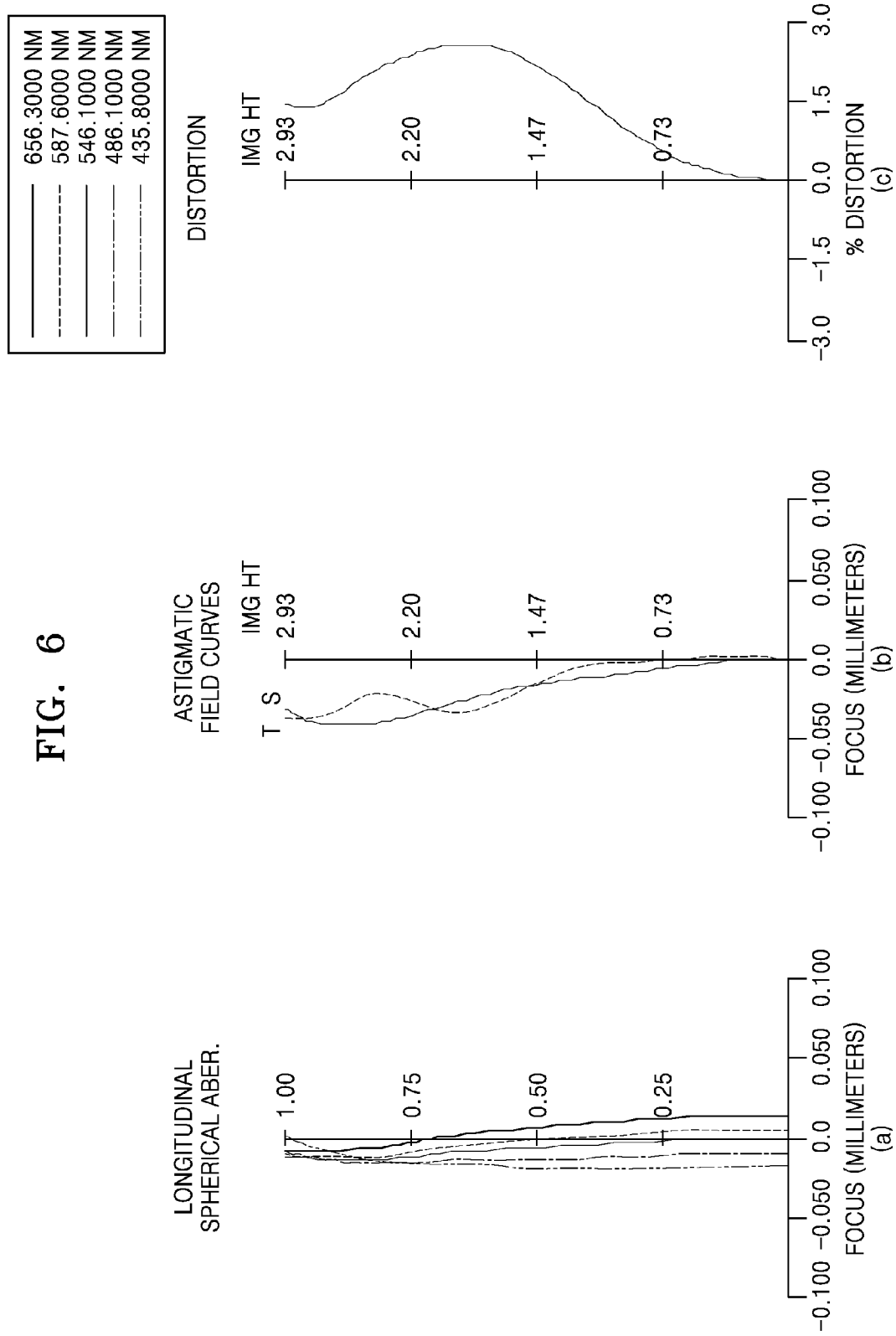
FIG. 6 illustrates longitudinal spherical aberrations, astigmatic field curvatures, and distortion of a lens optical system, according to another exemplary embodiment.

FIG. 6 illustrates longitudinal spherical aberrations, astigmatic field curvatures, and distortion of the lens optical system of FIG. 3 according to Table 4.

As described above, the optical lens systems according to the exemplary embodiments may include the first through fifth lenses I through V, which are sequentially arranged from the object OBJ to the image sensor IMG and respectively have positive, negative, positive, negative, and negative refractive powers, and satisfy at least one of Conditions 1 through 7 above. Such lens optical systems may have a wide viewing angle and a short total length, and may easily compensate for various aberrations. Accordingly, the lens optical system may be small, have a wide viewing angle, and have high performance and high resolution.

In detail, when at least one of the incident surface 10 and the emitting surface 11 of the fifth lens V is an aspheric surface having at least one inflection point from the center portion to the edge, that is, when the incident surface 10 is an aspheric surface having at least two inflection points from the center portion to the edge, the fifth lens V may be used to easily compensate for various aberrations and an emitting angle of a chief ray may be reduced to prevent vignetting.

Also, when the first through fifth lenses I through V are formed of plastic and both surfaces (the incident surfaces 2, 4, 6, 8, and 10 and the emitting surfaces 3, 5, 7, 9, and 11) of the first through fifth lenses I through V are aspheric surfaces, the lens optical systems that are compact and have excellent performance may be manufactured at low cost compared to when a glass lens is used.

It should be understood that exemplary embodiments described herein should be considered in a descriptive sense only and not for purposes of limitation. For example, it would be obvious to one of ordinary skill in the art that a blocking film may be used as a filter instead of the infrared blocking unit VI. While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A lens optical system comprising:
   first through fifth lenses, which are sequentially arranged along a light proceeding path between an object and an image sensor where an image of the object is formed; and
   an aperture provided between the object and the image sensor,
   wherein the first lens has positive refractive power,
   the second lens has negative refractive power and a flat incident surface,
   the third lens has positive refractive power and is convex towards the image sensor,
   the fourth lens has negative refractive power and is a meniscus lens convex towards the image sensor,
   the fifth lens has negative refractive power, wherein at least one of an incident surface and an emitting surface of the fifth lens is aspheric, and
   the lens optical system satisfies Conditions 1 and 2 below:

$70 < FOV < 90$,                                                         <Condition 1> wherein FOV denotes a diagonal viewing angle of the lens optical system; and $0.75 < AL/TTL < 1.0$,                                       <Condition 2> wherein AL denotes a distance from the aperture to the image sensor, and TTL denotes a distance along the optical axis from a center of an incident surface of the first lens to the image sensor.

2. The lens optical system of claim 1, satisfying Condition 3 below:

$$0.6<TTL/ImgH<0.9, \qquad \text{<Condition 3>}$$

wherein lmgH denotes a length in a diagonal direction of an effective pixel region of the image sensor.

3. The lens optical system of claim 1, satisfying Condition 4 below:

$$50<(V3+V4)/2<60, \qquad \text{<Condition 4>}$$

wherein V3 denotes an Abbe's number of the third lens and V4 denotes an Abbe's number of the fourth lens.

4. The lens optical system of claim 3, satisfying Condition 5 below:

$$0.6<(TTL/ImgH)/BFL<1.5, \qquad \text{<Condition 5>}$$

wherein BFL denotes a distance along the optical axis from a center of the emitting surface of the fifth lens to the image sensor, and lmgH denotes a length in a diagonal direction of an effective pixel region of the image sensor.

5. The lens optical system of claim 1, satisfying Condition 5 below:

$$0.6<(TTL/ImgH)/BFL<1.5, \qquad \text{<Condition 5>}$$

wherein BFL denotes a distance along the optical axis from a center of the emitting surface of the fifth lens to the image sensor, and lmgH denotes a length in a diagonal direction of an effective pixel region of the image sensor.

6. The lens optical system of claim 4, satisfying Condition 6 below:

$$1.3<Ind4<1.7, \qquad \text{<Condition 6>}$$

wherein Ind4 denotes a refractive index of the fourth lens.

7. The lens optical system of claim 1, satisfying Condition 6 below:

$$1.3<Ind4<1.7, \qquad \text{<Condition 6>}$$

wherein Ind4 denotes a refractive index of the fourth lens.

8. The lens optical system of claim 6, satisfying Condition 7 below:

$$35°<CRA8<45°, \qquad \text{<Condition 7>}$$

wherein CRA8 denotes a chief ray angle incident on a Y-axis 0.8 field with respect to the image sensor.

9. The lens optical system of claim 1, satisfying Condition 7 below:

$$35°<CRA8<45°, \qquad \text{<Condition 7>}$$

wherein CRA8 denotes a chief ray angle incident on a Y-axis 0.8 field with respect to the image sensor.

10. The lens optical system of claim 1, wherein the first lens has an incident surface convex towards the object.

11. The lens optical system of claim 1, wherein an emitting surface of the second lens is concave from the image sensor.

12. The lens optical system of claim 1, wherein at least one of the first through fourth lenses is an aspheric lens.

13. The lens optical system of claim 1, wherein at least one of the incident surface and the emitting surface of the fifth lens has at least one inflection point from a center portion to an edge.

14. A lens optical system comprising:
first through fifth lenses, which are sequentially arranged from an object, between the object and an image sensor where an image of the object is formed; and
an aperture provided between the object and the image sensor,
wherein the first through fifth lenses respectively have positive, negative, positive, negative, and negative refractive powers, and
the lens optical system satisfies at least one of Conditions 1 through 4 below:

$$70<FOV<90, \qquad \text{<Condition 1>}$$

wherein FOV denotes a diagonal viewing angle of the lens optical system;

$$0.75<AL/TTL<1.0, \qquad \text{<Condition 2>}$$

wherein AL denotes a distance from the aperture to the image sensor, and TTL denotes a distance along the optical axis from a center of an incident surface of the first lens to the image sensor;

$$0.6<TTL/ImgH<0.9, \qquad \text{<Condition 3>}$$

wherein lmgH denotes a length in a diagonal direction of an effective pixel region of the image sensor; and $$50<(V3+V4)/2<60, \qquad \text{<Condition 4>}$$

wherein V3 denotes an Abbe's number of the third lens and V4 denotes an Abbe's number of the fourth lens.

15. The lens optical system of claim 14, further satisfying Condition 5 below:

$$0.6<(TTL)lmgH/BFL<1.5, \qquad \text{<Condition 5>}$$

wherein BFL denotes a distance along the optical axis from a center of an emitting surface of the fifth lens to the image sensor.

16. The lens optical system of claim 15, further satisfying one of Conditions 6 and 7 below:

$$1.3<Ind4<1.7, \qquad \text{<Condition 6>}$$

wherein Ind4 denotes a refractive index of the fourth lens; and $$35°<CRA8<45°, \qquad \text{<Condition 7>}$$

wherein CRA8 denotes a chief ray angle incident on an Y-axis 0.8 field with respect to the image sensor.

17. The lens optical system of claim 14, wherein the first lens has an incident surface convex towards the object,
the second lens is concave with respect to the image sensor,
the third lens is convex towards the image sensor,
the fourth lens is a meniscus lens convex towards the image sensor, and
the fifth lens is an aspheric lens.

18. The lens optical system of claim 17, wherein the aperture is provided between the object and the first lens or between the first and second lenses.

19. The lens optical system of claim 14, wherein the aperture is provided between the object and the first lens or between the first and second lenses.

* * * * *